US010937264B2

(12) United States Patent
Covi

(10) Patent No.: US 10,937,264 B2
(45) Date of Patent: Mar. 2, 2021

(54) SYSTEMS AND METHODS FOR DISARMING A SECURITY SYSTEM MONITORING A SECURED AREA USING A TWO-DIMENSIONAL SCANNABLE ACCESS CODE

(71) Applicant: Ademco Inc., Golden Valley, MN (US)

(72) Inventor: Andrew Covi, Golden Valley, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/170,728

(22) Filed: Oct. 25, 2018

(65) Prior Publication Data
US 2019/0130678 A1    May 2, 2019

Related U.S. Application Data

(60) Provisional application No. 62/580,168, filed on Nov. 1, 2017.

(51) Int. Cl.
G07C 9/00 (2020.01)
G06F 21/36 (2013.01)
(Continued)

(52) U.S. Cl.
CPC .............. *G07C 9/33* (2020.01); *G06F 21/36* (2013.01); *G06K 7/1417* (2013.01);
(Continued)

(58) Field of Classification Search
CPC ............ G06F 21/35; G06F 2221/2121; G06K 7/10366; G06Q 10/08; H04W 4/008; H04W 4/021; H04W 4/04
(Continued)

(56) References Cited

U.S. PATENT DOCUMENTS 8,459,560 B1 * 6/2013 Mineo-Goggin ........ G02B 5/32
235/487
8,844,811 B1 * 9/2014 Rogers ............... G07C 9/00904
235/382
(Continued)

FOREIGN PATENT DOCUMENTS

CN   105139491 A   12/2015
KR   2015134806 A   12/2015
(Continued)

OTHER PUBLICATIONS

English language translation of abstract, claims, and description of CN105139491.

(Continued)

*Primary Examiner* — Yong Hang Jiang
(74) *Attorney, Agent, or Firm* — Fredrikson & Byron, P.A.

(57) ABSTRACT

Systems and methods for disarming a security system using a two-dimensional scannable access code are provided. Such systems and methods can include a control panel the security that generates a valid two-dimensional scannable access code, stores identifying information for the valid two-dimensional scannable access code in a memory device of the security system, and shares the valid two-dimensional scannable access code with a user of the security system. In some embodiments, when the security system is in an armed state, the security system can scan a presented two-dimensional scannable access code, decode associated information from the presented two-dimensional scannable access code, compare the associated information to the identifying information, and when the associated information matches the identifying information, transition the security system from the armed state to a disarmed state to allow the user to access an area protected by the security system.

18 Claims, 3 Drawing Sheets

(51) Int. Cl.
*G06K 7/14* (2006.01)
*G07C 9/33* (2020.01)
*G08B 25/00* (2006.01)
*G08B 3/10* (2006.01)

(52) U.S. Cl.
CPC ....... *G07C 9/00174* (2013.01); *G08B 25/008* (2013.01); *G08B 3/10* (2013.01)

(58) Field of Classification Search
USPC ............................................ 340/5.1, 5.2, 5.7
See application file for complete search history.

(56) References Cited

U.S. PATENT DOCUMENTS

| | | | |
|---|---|---|---|
| 9,536,236 B2 | 1/2017 | Hay | |
| 2003/0132829 A1* | 7/2003 | Frolov | E05B 47/00 340/5.7 |
| 2009/0166439 A1* | 7/2009 | Su | G06K 19/06037 235/494 |
| 2012/0252420 A1* | 10/2012 | Czaja | H04W 48/04 455/414.1 |
| 2013/0141587 A1* | 6/2013 | Petricoin, Jr. | G07C 9/28 348/156 |
| 2015/0228133 A1* | 8/2015 | Capaldi-Tallon | G07C 9/28 340/5.54 |
| 2015/0317597 A1 | 11/2015 | Shucker et al. | |
| 2016/0055698 A1* | 2/2016 | Gudmundsson | G07C 9/00142 340/5.52 |
| 2016/0239653 A1* | 8/2016 | Loughlin-Mchugh | G06F 21/35 |

FOREIGN PATENT DOCUMENTS

| | | |
|---|---|---|
| KR | 10-2017-0035644 | 3/2017 |
| WO | WO 2017/008279 A1 | 1/2017 |
| WO | WO 2017/054840 A1 | 4/2017 |

OTHER PUBLICATIONS

English language translation of bibliography, abstract, claim, and description for KR2015134806A.
English language translation of bibliographic data and abstract for KR20170035644 (A).
English language translation of abstract, claims, and description of WO2017008279A1.
Forma Labs Wiki, using-the-door—Wiki—Forma Labs, Jun. 11, 2017, https://tree.taiga.io/project/cathalgarvey-forma-labs/wiki/using-the-door.
Extended European search report for corresponding EP patent application 18203877.8, dated Feb. 19, 2019.

* cited by examiner

SYSTEMS AND METHODS FOR DISARMING A SECURITY SYSTEM MONITORING A SECURED AREA USING A TWO-DIMENSIONAL SCANNABLE ACCESS CODE

CROSS REFERENCE TO RELATED APPLICATIONS

This application claims priority to U.S. Provisional Application No. 62/580,168 filed Nov. 1, 2017 and titled "SYSTEMS AND METHODS FOR DISARMING A SECURITY SYSTEM MONITORING A SECURED AREA USING A TWO-DIMENSIONAL SCANNABLE ACCESS CODE." U.S. Provisional Application No. 62/580,168 is hereby incorporated by reference.

FIELD

The present invention relates generally to disarming a security system monitoring a secured area. More particularly, the present invention relates to systems and methods for disarming the security system using a two-dimensional scannable access code.

BACKGROUND

Systems and methods to disarm a security system monitoring a secured area are known in the art. However, it can be difficult and problematic to disarm the security system without an internet connection, especially when no keypad is provided or available to receive user input. Furthermore, when a key code is used to disarm the security system, the key code requires that a user is within the secured area to use the key code and, in general, can be difficult to manage.

In view of the above, there is a continuing, ongoing need for improved systems and methods.

DETAILED DESCRIPTION

Figure 1:
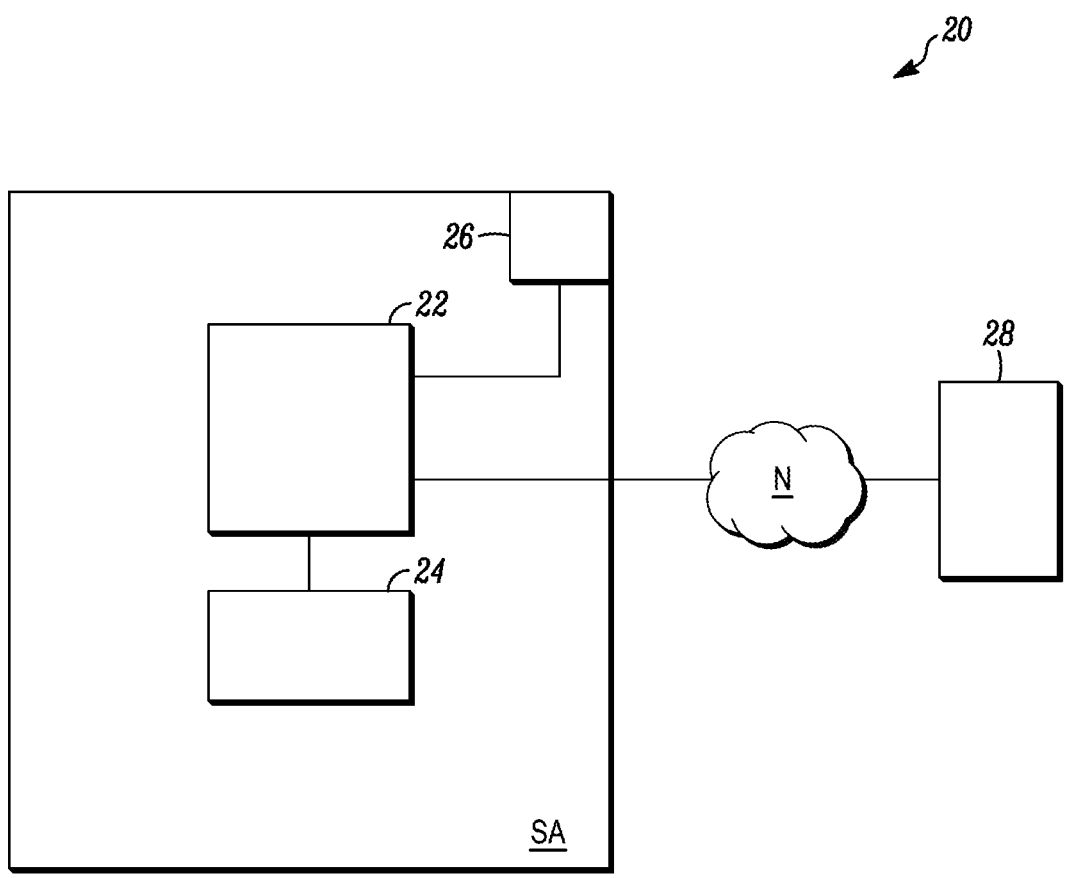
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for disarming a security system monitoring a secured area using a two-dimensional scannable access code. For example, in some embodiments, a security camera connected to the security system and located outside of the secured area can scan a presented two-dimensional scannable access code, thereby leveraging connected cameras in the security system. When the security camera or a control panel or other hub in communication therewith verifies that the presented two-dimensional scannable access code is authorized to disarm the security system, the security camera, the control panel, or the other hub can transmit a signal to disarm the security system and unlock connected door locks in the security system.

In some embodiments, the control panel or the other hub of the security system can generate a valid two-dimensional scannable access code prior to the presented two-dimensional scannable access being scanned by the security camera. Responsive thereto, the control panel or the other hub can store identifying information for the valid two-dimensional scannable access code in a memory device. Then, the control panel or the other hub can verify that the that the presented two-dimensional scannable access code scanned by the security camera is authorized by comparing the identifying information for the valid two-dimensional scannable access code in the memory device with associated information decoded from the presented two-dimensional scannable access code scanned by the security camera. When the identifying information matches the associated information, the control panel or the other hub can disarm the security system.

In some embodiments, the two-dimensional scannable access code can include a QR code, and in some embodiments, the QR code can be uniquely generated and include a salted hash. In some embodiments, the salted hash can include information related to authorized use of the QR code, such as, for example, time-bound limits during which the QR code is valid or an expiration data for the QR code. In some embodiments, after generation, the QR code can be shared as an image file.

In some embodiments, the two-dimensional scannable access code can be shared with a user device of one or more individuals by, for example, using known messaging platforms and applications, including transmitting the two-dimensional scannable access code within a push notification or integrating the two-dimensional scannable access code into a smart watch, other wearable device, or a passbook-type digital wallet. In some embodiments, the two-dimensional scannable access code can be printed for the one or more individuals, when necessary.

In some embodiments, systems and methods disclosed herein can work entirely offline. Accordingly, in the event of an internet outage, the two-dimensional scannable access code can be shared to provide one-time access to designated recipients thereof. For example, the memory device can be directly accessible by the control panel or the other hub of the security system when access to a wide area network, such as the internet, is disrupted.

In some embodiments, the two-dimensional scannable access code can have time-bound limits, and in some embodiments, access to the security system or the secured area using the two-dimensional scannable access code can be instantly revoked.

FIG. 1 is a block diagram of security system 20 in accordance with disclosed embodiments. As seen in FIG. 1, the security system 20 can include a control panel 22, a memory device 24, a camera 26, and a mobile device 28. The control panel 22 and the memory device 24 can be coupled together via a local connection, such as a local area network or a direct wired or wireless connection. In some embodiments, the control panel 22 and the memory device 24 can be located within a secured area SA that is protected by the security system 20 and at least partially controlled by the control panel 22. The camera 26 can be located within or proximate to the secured area SA and can include a field of view that encompasses an area inside or outside of the secured area SA. The mobile device 28 can communicate with the control panel 22 via a network N, and in some embodiments, the network N can include a wide area network, such as the internet.

Figure 2:
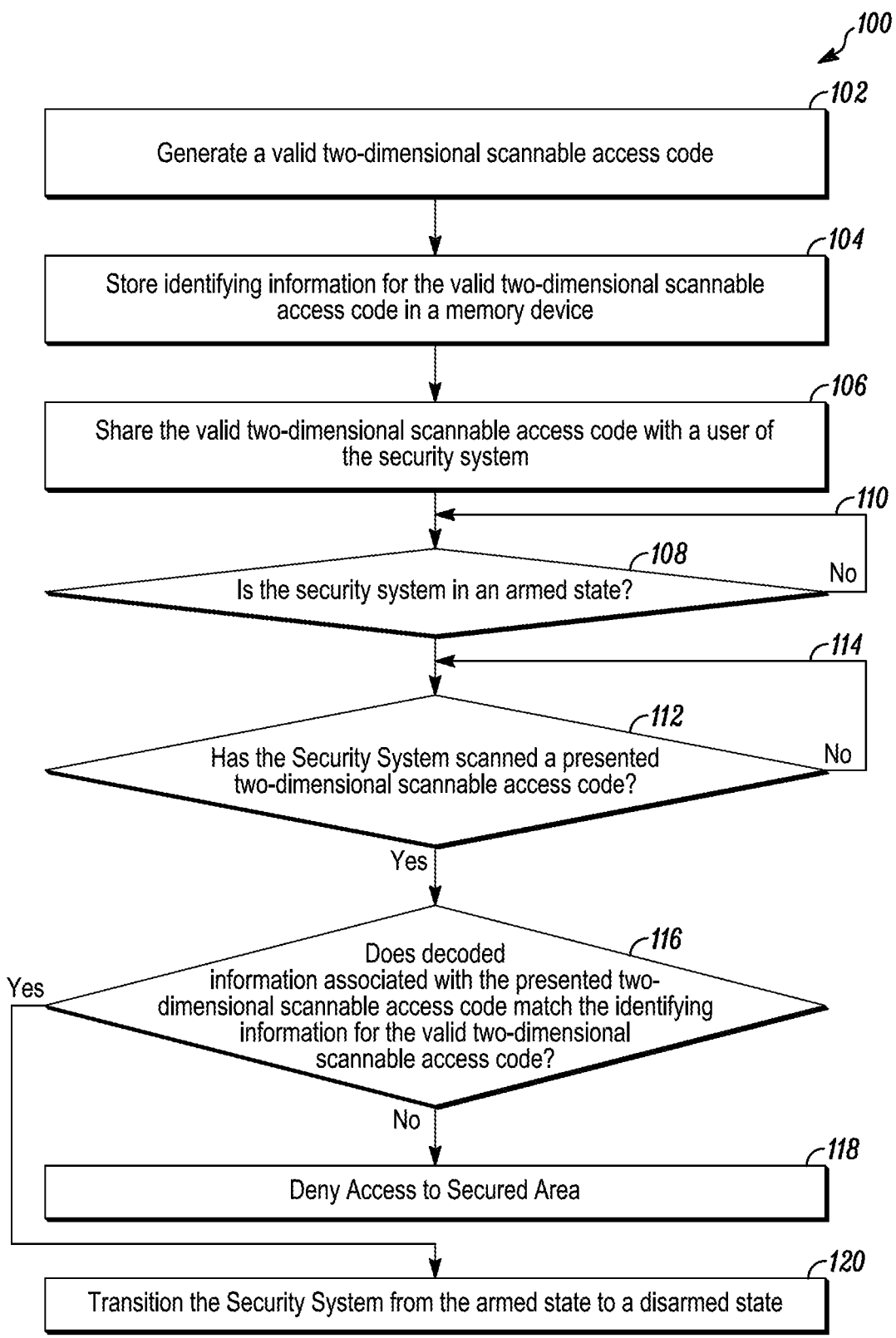
FIG. 2 is a flow diagram of a method in accordance with disclosed embodiments.

FIG. 2 is a flow diagram of a method 100 in accordance with disclosed embodiments. As seen in FIG. 2, the method 100 can include, the control panel 22 generating a valid two dimensional scannable access code, as in 102, and storing identifying information for the valid two dimensional scannable access code in the memory device 24, as in 104. The method 100 can also include the control panel 22 sharing the valid two dimensional scannable access code with a user of the security system 20. For example, in some embodiments, the control panel 22 can generate an image of the valid two-dimensional scannable access code and transmit the image to the mobile device 28 via the network N.

Next, the method 100 can include the control panel 22 determining whether the security system 20 is in an armed state, as in 108, and continuing to determine whether the security system 20 is in the armed state, as in 110, until the control panel 22 determines that the security system 20 is in the armed state. Responsive thereto, the method 100 can include the control panel 22 determining whether the security system 20 has scanned a presented two-dimensional scannable access code, as in 112, and continuing to determine whether the security system 20 has scanned the presented two-dimensional scannable access code, as in 114, until the control panel 22 determines that the security system 20 has done so. Responsive thereto, the method 100 can include the security system 20 determining whether decoded information associated with the presented two-dimensional scannable access code matches the identifying information for the valid two-dimensional scannable access code, as in 116. When the decoded information fails to match the identifying information, the method 100 can include the security system 20 denying access to the secured area SA, as in 118. However, when the decoded information matches the identifying information, the method 100 can include the security system 20 transitioning from the armed state to a disarmed state to allow the access to the secured area SA, as in 120.

In some embodiments, when the decoded information matches the identifying information, the method 100 can include determining whether the presented two-dimensional scannable access code has expired. For example, the method 100 can include embedding authorized use information in the valid two-dimensional scannable access code and the security system 20 transitioning from the armed state to the disarmed state, as in 120, when current conditions match the authorized use information. In some embodiments, the authorized use information can include time and date bound limits for the valid two-dimensional scannable access code, and the current conditions can include a current date and a current time.

Figure 3:
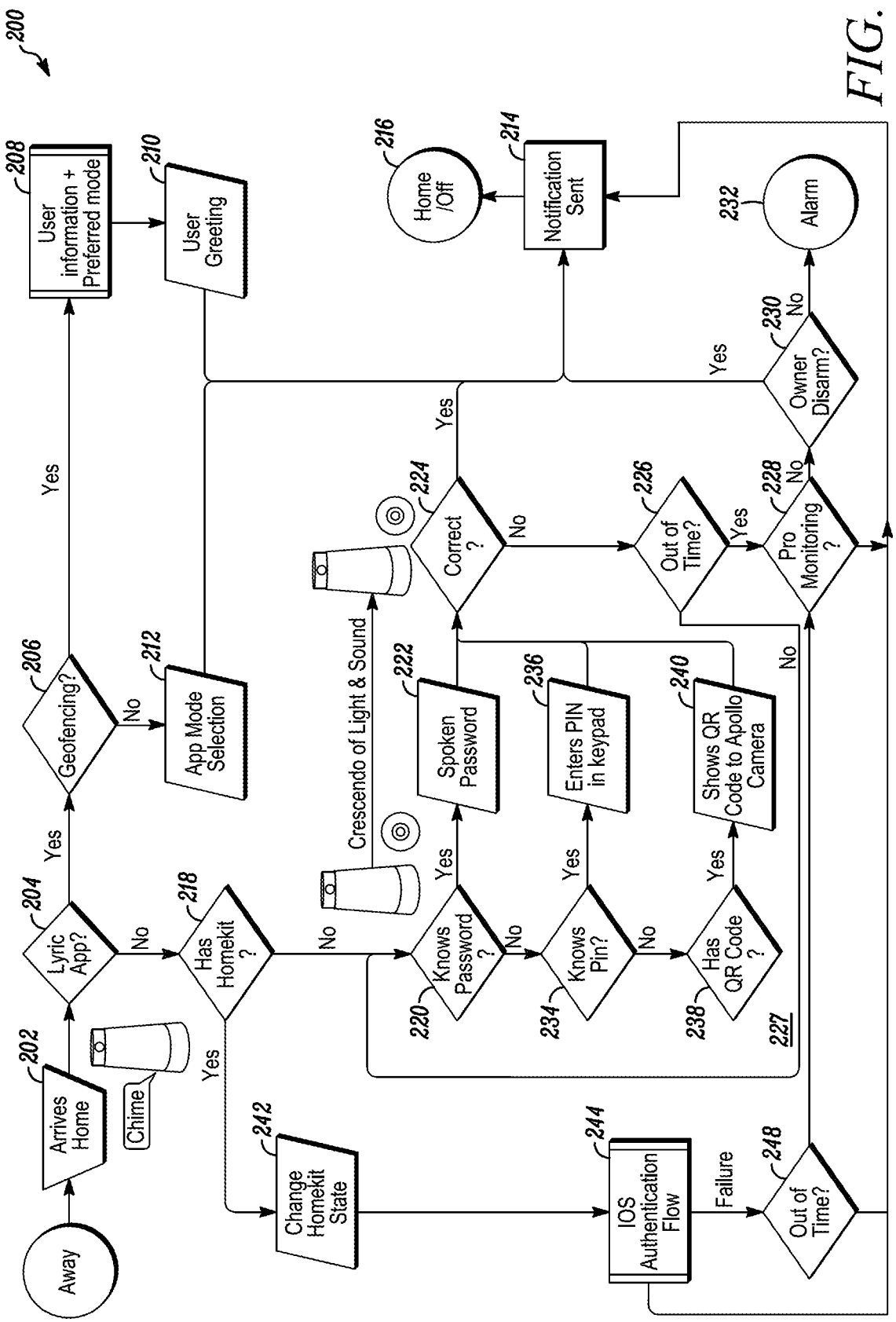
FIG. 3 is a flow diagram of a method in accordance with disclosed embodiments.

FIG. 3 is a flow diagram of a method 200 in accordance with disclosed embodiments. The method 200 can include the mobile device 28 arriving at the secured area SA, as in 202. Then, the method 200 can include the mobile device 28 determining whether a first mobile application associated with the security system 20 is installed on the mobile device 28, as in 204. If so, then the method 200 can include the mobile device 28 determining whether a geofencing mode is active and indicative of the mobile device 28 being located within a defined geofence for the secured area SA, as in 206, and responsive thereto, the control panel 22 initiating a preferred user mode and audibly transmitting a user greeting, as in 208 and 210. However, when the geofencing mode is inactive or indicative of the mobile device 28 being located outside of the defined geofence, the method 200 can include the mobile device 28 executing an application mode selection, as in 212. Following either execution of the application mode selection as in 212 or transmission of the user greeting as in 210, the method 200 can include the control panel 22 transmitting a notification to an owner of the secured area SA, as in 214, and disarming the security system 20, as in 216.

As seen in FIG. 3, when the first mobile application is not installed on the mobile device 28, the method 200 can include the mobile device 28 determining whether a second mobile application capable of controlling the security system is installed on the mobile device 28, as in 218. If not, then the method 200 can include the mobile device 28 receiving user input for instructing the security system 20 to receive a spoken password for the security system 20, as in 220, the security system 20 receiving the spoken password, as in 222, and the control panel 22 verifying that the spoken password received is valid, as in 224. When the mobile device 28 does not receive the user input for instructing the security system 20 to receive the spoken password for the security system, the method 200 can include the mobile device 28 receiving user input instructing the security system 20 to receive a pin code for the security system 20, as in 234, the security system 20 receiving the pin code, as in 236, and the control panel 22 verifying that the pin code received is valid, as in 224. When the mobile device 28 does not receive the user input for instructing the security system 20 to receive the pin code, the method 200 can include the mobile device 28 receiving user input instructing the security system 20 to receive a QR code or other two-dimensional scannable access code for the security system 20, as in 238, the camera 26 scanning the QR code or the other two-dimensional scannable access code presented, as in 240, and the control panel 22 determining whether the QR code or the other two-dimensional scannable access code scanned is valid, as in 224. Following validation of any of the spoken password, the pin code, the QR code, or the other two-dimensional scannable access code, the method 200 can include the control panel 22 transmitting the notification to the owner of the secured area SA, as in 214, and disarming the security system 20, as in 216.

As seen in FIG. 3, when the spoken password, the pin code, the QR code, or the other two-dimensional scannable access code is invalid, that is, incorrect, the method 200 can include the control panel 22 determining whether a time limit has expired, as in 226, and continuing to determine whether the mobile device 28 receives the user input for instructing the security system 20 to receive the spoken password, the pin code, the QR code, or the other two-dimensional scannable access code, as in 227, until the time limit expires. However, when the time limit expires, the method 200 can include the control panel 22 determining whether professional monitoring is enabled for the secured area SA, as in 228, and responsive thereto, determining whether the owner of the secured area SA has disarmed the security system 20, as in 230. When the professional monitoring is enabled for the secured area SA, the method 200 can include the control panel 22 transmitting the notification to the owner of the secured area SA, as in 214, and disarming the security system 20, as in 216. When the professional monitoring is not enabled for the secured area SA, but the owner has disarmed the security system 20, the method 200 can include the control panel 22 transmitting the notification to the owner of the secured area SA, as in 214, and disarming the security system 20, as in 216. When the professional monitoring is not enabled for the secured area SA and the owner has not disarmed the security system 20, the method 200 can include the control panel 22 generating an alarm, as in 232.

As seen in FIG. 3, when the second mobile application capable of controlling the security system 20 is installed on the mobile device 28, the method 200 can include the mobile device 28 changing a state of the second mobile application, as in 242, and running an authentication flow associated with the second mobile application, as in 244. When the authentication flow fails, the method 200 can include the control panel 22 determining whether the time limit has expired, as in 248, determining whether the professional monitoring is enabled for the secured area SA, as in 228, and determining whether the owner of the secured area SA has disarmed the security system 20, as in 230. However, when the authentication flow succeeds, the method 200 can include transmitting the notification to the owner of the secured area SA, as in 214, and disarming the security system 20, as in 216.

It is to be understood that each of the control panel, the memory device, and other devices as disclosed herein can include a transceiver device and a local memory device, each of which can be in communication with control circuitry, one or more programmable processors, and executable control software as would be understood by one of ordinary skill in the art. In some embodiments, the executable control software can be stored on a transitory or non-transitory computer readable medium, including, but not limited to local computer memory, RAM, optical storage media, magnetic storage media, flash memory, and the like, and some or all of the control circuitry, the programmable processors, and the executable control software can execute and control at least some of the methods described herein.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   generating a valid two-dimensional scannable access code;
   storing identifying information for the valid two-dimensional scannable access code in a memory device;
   sharing the valid two-dimensional scannable access code with a user of a security system;
   when the security system is in an armed state, scanning a presented two-dimensional scannable access code;
   decoding associated information from the presented two-dimensional scannable access code;
   comparing the associated information decoded from the presented two-dimensional scannable access code to the identifying information stored in the memory device;
   retrieving authorized use information embedded in the presented two-dimensional scannable access code; and
   when the associated information decoded from the presented two-dimensional scannable access code matches the identifying information stored in the memory device and current conditions match the authorized use information retrieved from the presented two-dimensional scannable access code, transitioning the security system from the armed state to a disarmed state to allow the user to access an area protected by the security system.

2. The method of claim 1 wherein the authorized use information embedded in the presented two-dimensional scannable access code includes time and date bound limits for the presented two-dimensional scannable access code, and wherein the current conditions include a current date and a current time.

3. The method of claim 1 wherein the authorized use information embedded in the presented two-dimensional scannable access code is included in a salted hash of the presented two-dimensional scannable access code.

4. The method of claim 1 further comprising:
   scanning the presented two-dimensional scannable access code using a camera.

5. The method of claim 1 wherein the valid two-dimensional scannable access code includes a QR code.

6. The method of claim 1 wherein the valid two-dimensional scannable access code includes a bar code.

7. The method of claim 1 wherein the memory device is directly accessible by the security system when access to a wide area network is disrupted.

8. The method of claim 1 further comprising:
   generating an image of the valid two-dimensional scannable access code; and
   sharing the valid two-dimensional scannable access code with the user by transmitting the image to a mobile device of the user.

9. The method of claim 8 wherein the image is suitable for storing in a digital wallet of the mobile device.

10. A system comprising:
    a control panel of a security system; and
    a memory device of the security system,
    wherein the control panel generates a valid two-dimensional scannable access code, stores identifying information for the valid two-dimensional scannable access code in the memory device, and shares the valid two-dimensional scannable access code with a user of the security system,
    wherein, when the security system is in an armed state, the security system scans a presented two-dimensional scannable access code, and
    wherein the control panel decodes associated information from the presented two-dimensional scannable access code, compares the associated information decoded from the presented two-dimensional scannable access code to the identifying information stored in the memory device, retrieves authorized use information embedded in the presented two-dimensional scannable access code, and when the associated information decoded from the presented two-dimensional scannable access code matches the identifying information stored in the memory device and current conditions match the authorized use information retrieved from the presented two-dimensional scannable access code, transitions the security system from the armed state to a disarmed state to allow the user to access an area protected by the security system.

11. The system of claim 10 wherein the authorized use information embedded in the presented two-dimensional scannable access code includes time and date bound limits for the presented two-dimensional scannable access code, and wherein the current conditions include a current date and a current time.

12. The system of claim 10 wherein the authorized use information embedded in the presented two-dimensional scannable access code is included in a salted hash of the presented two-dimensional scannable access code.

13. The system of claim 10 further comprising:
a camera of the security system that scans the presented two-dimensional scannable access code.

14. The system of claim 10 wherein the valid two-dimensional scannable access code includes a QR code.

15. The system of claim 10 wherein the valid two-dimensional scannable access code includes a bar code.

16. The system of claim 10 wherein the memory device is directly accessible by the control panel when access to a wide area network is disrupted.

17. The system of claim 10 wherein the control panel generates an image of the valid two-dimensional scannable access code and shares the valid two-dimensional scannable access code with the user by transmitting the image to a mobile device of the user.

18. The system of claim 17 wherein the image is suitable for storing in a digital wallet of the mobile device.

* * * * *